US012586699B2

(12) United States Patent
Eda et al.

(10) Patent No.: US 12,586,699 B2
(45) Date of Patent: Mar. 24, 2026

(54) COIL COMPONENT

(71) Applicant: TDK CORPORATION, Tokyo (JP)

(72) Inventors: Hokuto Eda, Tokyo (JP); Hitoshi Ohkubo, Tokyo (JP); Masazumi Arata, Tokyo (JP); Masataro Saito, Tokyo (JP); Kohei Takahashi, Tokyo (JP); Takamasa Iwasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 844 days.

(21) Appl. No.: 17/898,767

(22) Filed: Aug. 30, 2022

(65) Prior Publication Data

US 2023/0063586 A1 Mar. 2, 2023

(30) Foreign Application Priority Data

Sep. 1, 2021 (JP) ................................ 2021-142535

(51) Int. Cl.

| | |
|---|---|
| ***H01F 27/28*** | (2006.01) |
| ***H01F 1/14*** | (2006.01) |
| ***H01F 5/04*** | (2006.01) |
| ***H01F 5/06*** | (2006.01) |

(52) U.S. Cl.

CPC ................ *H01F 1/14* (2013.01); *H01F 5/04* (2013.01); *H01F 5/06* (2013.01)

(58) Field of Classification Search

CPC ..... H01F 1/14; H01F 5/04; H01F 5/06; H01F 1/15375; H01F 1/37; H01F 17/04; H01F 17/0013; H01F 1/26; H01F 27/292; H01F 2017/048

USPC ................................ 336/177, 200, 232, 192

See application file for complete search history.

(56) References Cited

U.S. PATENT DOCUMENTS

| | | | | |
|---|---|---|---|---|
| 2013/0222101 | A1* | 8/2013 | Ito | H01F 3/08 336/83 |
| 2016/0071643 | A1* | 3/2016 | Heo | H01F 41/041 336/200 |
| 2018/0240586 | A1 | 8/2018 | Yoon et al. | |
| 2019/0122811 | A1* | 4/2019 | Jung | H01F 5/06 |
| 2019/0189338 | A1* | 6/2019 | Kim | H01F 27/29 |
| 2019/0318854 | A1* | 10/2019 | Park | B22F 1/052 |
| 2020/0033428 | A1* | 1/2020 | Yoshinaka | H01F 17/0013 |

FOREIGN PATENT DOCUMENTS

| | | |
|---|---|---|
| JP | 2018-137421 A | 8/2018 |

* cited by examiner

*Primary Examiner* — Shawki S Ismail
*Assistant Examiner* — Kazi S Hossain
(74) *Attorney, Agent, or Firm* — Oliff PLC

(57) ABSTRACT

Since the magnetic sheet is adopted as the coil component, magnetic saturation is likely to occur in the magnetic sheet, and it is considered that the DC superimposition characteristic of the coil component is deteriorated. However, since the inner edge of the coil structure backs down with respect to the inner edge of the magnetic sheet so that the magnetic flux generated in the coil easily circulates, the deterioration of the DC superimposition characteristics due to the adoption of the magnetic sheet is suppressed.

5 Claims, 9 Drawing Sheets

COIL COMPONENT

CROSS-REFERENCE TO RELATED APPLICATIONS

This application is based upon and claims the benefit of priority from Japanese Patent Application No. 2021-142535, filed on 1 Sep. 2021, the entire contents of which are incorporated herein by reference.

TECHNICAL FIELD

The present disclosure relates to a coil component.

BACKGROUND

Well known in the art is a coil component in which a pair of coils are overlapped with each other in a coil axis direction. Japanese Patent Application Publication No. 2018-137421 discloses a coil component in which a PCB substrate is interposed between a pair of coils, and a high coupling coefficient is obtained by the PCB substrate which is a non-magnetic body.

SUMMARY

In the coil component according to the related art described above, in the case where a magnetic sheet that is a magnetic body is adopted instead of the PCB substrate that is a non-magnetic body, magnetic saturation is likely to occur in the magnetic sheet, and it is considered that DC superimposition characteristics of the coil component are deteriorated.

As a result of intensive studies, the inventors have newly found a technique capable of suppressing a deterioration of DC superimposition characteristics even when the magnetic sheet is employed.

According to the present disclosure, there is provided a coil component capable of suppressing a deterioration of DC superimposition characteristics.

A coil component according to one aspect of the present disclosure includes an element body made of a metal powder-containing resin, a pair of coil structures provided in the element body, each of the pair of coil structures includes a pair of coils overlapping each other in a coil axis direction, each of the pair of coils has a pair of end portions extending to the surface of the element body, two pairs of external terminals provided on the surface of the element body and connected to the end portions of the pair of coils, respectively, and, a magnetic sheet provided in the element body and interposed between the pair of coil structures in the coil axis direction, wherein each of the pair of coil structures and the magnetic sheet is provided with a through hole extending along the coil axis direction, and an inner edge of at least one of the pair of coil structures backs down with respect to an inner edge of the magnetic sheet.

In the above-described coil component, since the inner edge of the coil structure backs down with respect to the inner edge of the magnetic sheet, the magnetic flux generated from the coil easily circulates, and the partial concentration of the magnetic flux is reduced, thereby suppressing the deterioration of the DC superimposition characteristic.

In the coil component according to another aspect, in at least one of the pair of coil structures, a position of the inner edge on a side far from the magnetic sheet in the coil axis direction backs down from a position of an inner edge on a side close thereto.

In the coil component according to another aspect, in a cross section including the coil axis, outer shapes of the pair of coil structures are line-symmetric with respect to a line orthogonal to the coil axis.

In the coil component according to another aspect, the inner edge of the magnetic sheet is in contact with metal powder contained in a metal powder-containing resin constituting the element body.

In the coil component according to the other aspect, element body portions overlapping the pair of coil structures in the coil axis direction have the same thickness.

DETAILED DESCRIPTION

Figure 1:
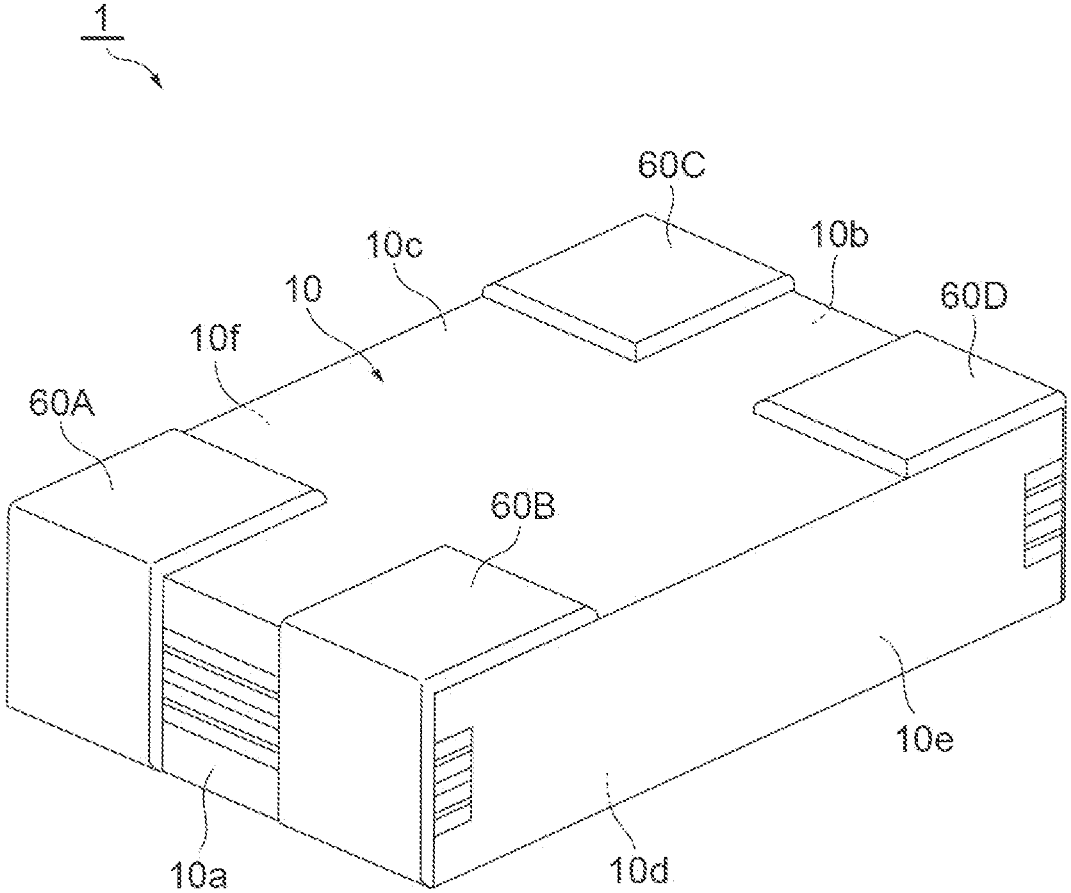
FIG. 1 is a schematic perspective view of a coil component according to an embodiment.

Hereinafter, embodiments of the present disclosure will be described in detail with reference to the accompanying drawings. In the description, the same reference numerals are used for the same elements or elements having the same functions, and redundant description will be omitted.

The coil component 1 according to the embodiment is a so-called coupling coil. The coupling coil includes two coils in one element, and can reduce the number of components and the mounting area. The coupling coil can be used as, for example, a smoothing coil of a switching power supply such as a DC/DC converter of various electronic devices.

Figure 2:
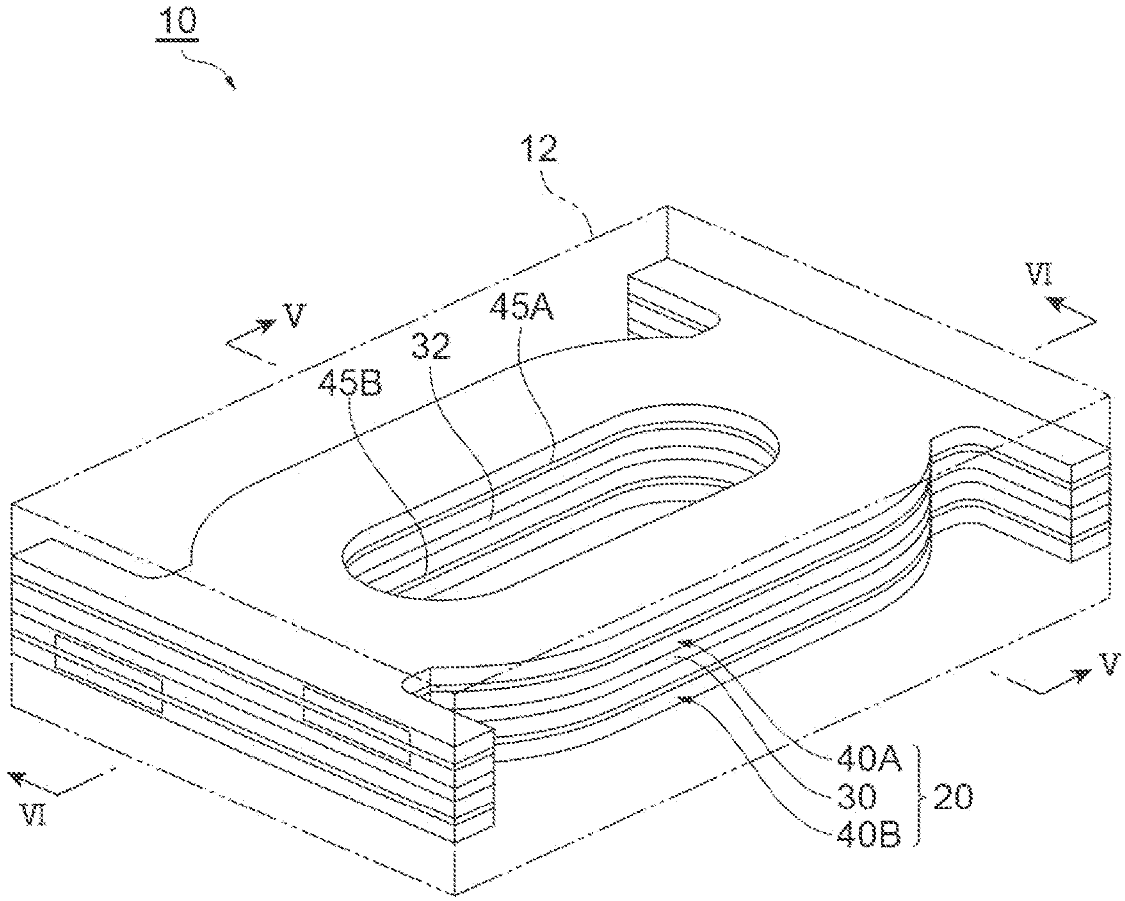
FIG. 2 is a view showing the inside of the coil component of FIG. 1.

As shown in FIGS. 1 and 2, the coil component 1 includes an element body 10, a coil structure 20 embedded in the element body 10, and two pairs of external terminal electrodes 60A, 60B, 60C, and 60D provided on the element body 10.

The element body 10 has a rectangular parallelepiped outer shape and has six surfaces 10*a* to 10*f*. As an example, the element body 10 is designed to have dimensions of long side 2.0 mm, short side 1.25 mm, and height 0.45 mm. Among the surfaces 10*a* to 10*f* of the element body 10, the end surface 10*a* and the end surface 10*b* are parallel to each other, the upper surface 10*c* and the lower surface 10*d* are parallel to each other, and the side surface 10*e* and the side surface 10*f* are parallel to each other. The upper surface 10*c* of the element body 10 is a surface facing in parallel to a mounting surface of a mounting substrate on which the coil component 1 is mounted.

The element body 10 is made of a metal magnetic powder-containing resin 12 which is one type of magnetic material. The metal magnetic powder-containing resin 12 contains metal powder and a resin, and more specifically, is a bound powder in which the metal magnetic powder is bound by a binder resin. The metal magnetic powder of the metal magnetic powder-containing resin 12 is composed of, for example, an iron-nickel alloy (permalloy alloy), carbonyl iron, an amorphous, FeSiCr alloy in amorphous or crystalline state, sendust, or the like. The binder resin is, for example, a thermosetting epoxy resin. In the present embodiment, the content of the metal magnetic powder in the bound powder is 80 to 92 vol % in terms of volume percent, and 95 to 99 wt % in terms of weight percent. From the viewpoint of magnetic properties, the content of the metal magnetic powder in the bound powder may be 85 to 92 vol % in terms of volume percent and 97 to 99 wt % in terms of weight percent. The magnetic powder of the metal magnetic powder-containing resin 12 may be a powder having one type of average particle diameter or may be a mixed powder having a plurality of types of average particle diameters.

The metal magnetic powder-containing resin 12 of the element body 10 integrally covers a coil structure 20 described later. Specifically, the metal magnetic powder-containing resin 12 covers the coil structure 20 from above and below and covers the outer periphery of the coil structure 20. The metal magnetic powder-containing resin 12 fills the inner peripheral region of the coil structure 20.

Figure 3:
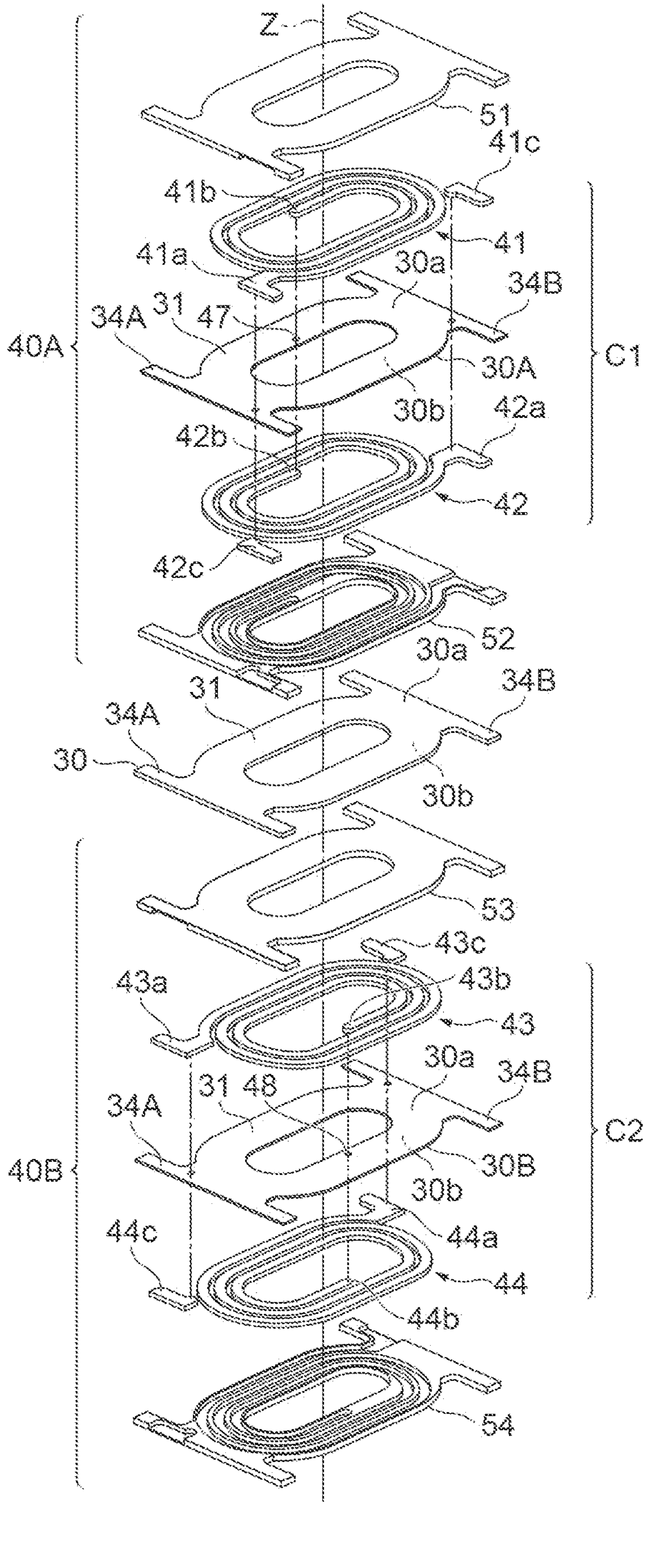
FIG. 3 is an exploded perspective view of the coil structure shown in FIG. 2.

As shown in FIGS. 2 and 3, the coil structure 20 includes a magnetic sheet 30, an upper coil structure 40A provided on the upper side of the magnetic sheet 30, and a lower coil structure 40B provided on the lower side of the magnetic sheet 30. The coil structure 20 is a stacked body in which an upper coil structure 40A, a magnetic sheet 30, and a lower coil structure 40B are stacked in this order, and the magnetic sheet 30 is interposed between the upper coil structure 40A and the lower coil structure 40B in the stacking direction.

Figure 4:
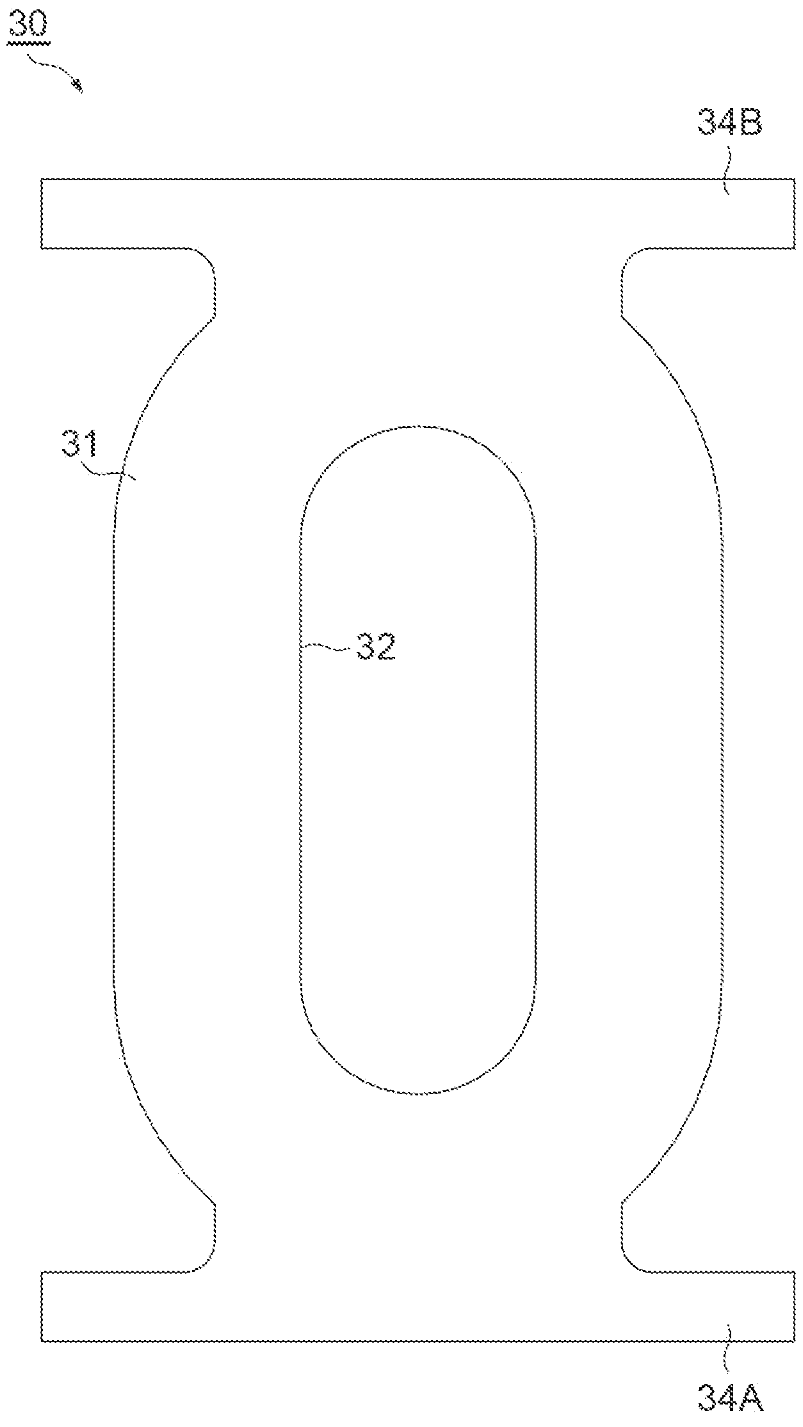
FIG. 4 is a plan view showing the magnetic sheet shown in FIG. 3.
Figure 5:
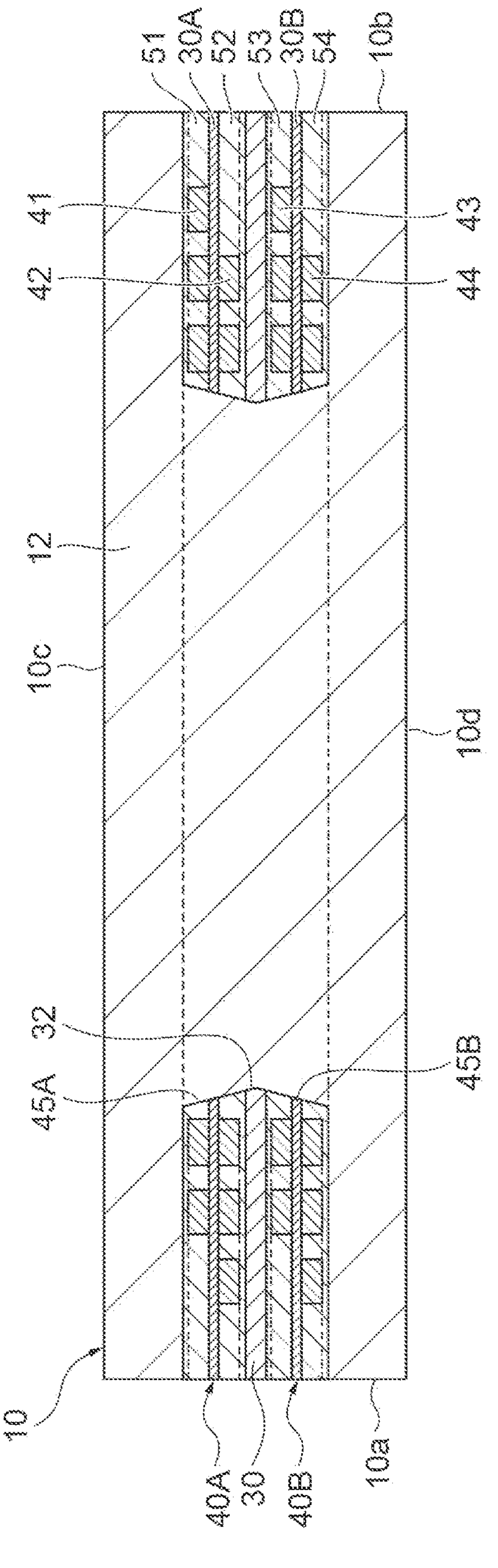
FIG. 5 is a cross-sectional view taken along line V-V of the element body shown in FIG. 2.

The magnetic sheet 30 has a flat plate shape (for example, a sheet shape or a layer shape), extends between the end surfaces 10*a* and 10*b* of the element body 10, and is designed to be orthogonal to the end surfaces 10*a* and 10*b*. The magnetic sheet 30 extends in parallel to the upper surface 10*c* and the lower surface 10*d* of the element body 10. As shown in FIG. 4, the magnetic sheet 30 includes an elliptical ring-shaped coil overlapping portion 31 extending along the long-side direction of the element body 10, and a pair of frame portions 34A and 34B extending along the short-side direction of the element body 10 and sandwiching the coil overlapping portion 31 from both sides. An elliptical opening (through hole) 32 extending along the long-side direction of the element body 10 is provided in a central portion of the coil overlapping portion 31. The thickness t of the magnetic sheet 30 can be designed to be, for example, 10 to 100 μm (as an example, 30 μm).

The magnetic sheet 30 is made of a magnetic material. In the present embodiment, the magnetic sheet 30 is configured to include resin and magnetic powder (magnetic material powder), and has a configuration in which the magnetic powder is dispersed in the resin. The resin of the magnetic sheet 30 is, for example, an epoxy resin. The magnetic powder of the magnetic sheet 30 may be made of, for example, ferrite, permalloy, sendust, an Fe-based magnetic material, or the like. The magnetic powder of the magnetic sheet 30 may have a flat shape, a needle shape, or a spherical shape. For example, when the magnetic powder of the magnetic sheet 30 has a flat shape, the magnetic powder may extend in a direction intersecting the thickness direction of the magnetic sheet 30 (for example, a direction orthogonal to the thickness direction of the magnetic sheet 30). The magnetic sheet 30 may be an amorphous foil, an amorphous ribbon, or an amorphous layer made of a magnetic material.

The magnetic sheet 30 according to the present embodiment has a configuration in which flat ferrite powder is substantially uniformly dispersed in epoxy resin, and the flat ferrite powder extends in a direction orthogonal to the thickness direction of the magnetic sheet 30. Therefore, the magnetic permeability of the magnetic sheet 30 in the direction orthogonal to the thickness direction is higher than that in the thickness direction. In addition, since the ferrite flat powder extends substantially parallel to the extending direction of the magnetic sheet 30, the magnetic permeability is increased while suppressing an increase in thickness of the magnetic sheet 30.

As shown in FIG. 3, the upper coil structure 40A is provided on the sheet upper surface 30*a* of the coil overlapping portion 31 of the magnetic sheet 30. The upper coil structure 40A includes an insulating layer 30A, a first upper planar coil 41, a second upper planar coil 42, a first upper insulator 51, and a second upper insulator 52, and has a through hole 45A.

The insulating layer 30A has a flat plate shape (for example, a sheet shape or a layer shape) and extends parallel to the magnetic sheet 30. The insulating layer 30A has substantially the same shape as the magnetic sheet 30 when viewed from the thickness-wise direction. That is, similarly to the magnetic sheet 30, the insulating layer 30A includes an elliptical ring-shaped coil overlapping portion 31 extending along the long-side direction of the element body 10, and a pair of frame portions 34A and 34B extending along the short-side direction of the element body 10 and sandwiching the coil overlapping portion 31 from both sides. The insulating layer 30A can be designed to have a depth t1 of, for example, 10 to 50 μm (15 μm as an example). The insulating layer 30A is made of an insulating material, for example, a resinous material such as B-resin.

The first upper planar coil 41 is a substantially oval spiral air-core coil wound around the opening 32 of the coil overlapping portion 31 in the same layer on the upper surface 30A of the insulating layer 30A. The first upper planar coil 41 has a coil axis Z along the thickness direction of the element body 10. The number of turns of the first upper planar coil 41 may be one or a plurality of turns. In the present embodiment, the number of turns of the first upper planar coil 41 is two to three. The first upper planar coil 41 has an outer end 41*a* and an inner end 41*b*. The outer end portion 41*a* is provided on the frame portion 34A, extends to the end surface 10*a* of the element body 10, and is exposed from the end surface 10*a*. The inner end portion 41*b* is provided at an edge of the opening 32. In the insulating layer 30A, a through conductor 47 extending in the thickness direction of the insulating layer 41*b* is provided at a position overlapping the inner end portion 30A of the first upper planar coil 41 so as to penetrate the insulating layer 30A. The first upper planar coil 41 is made of Cu, for example, and can be formed by electrolytic plating. In the present embodiment, the first upper planar coil 41 has an auxiliary outer end portion 42*a* that overlaps an outer end portion 30A of a second upper planar coil 42 described later with an insulating layer 41*c* interposed therebetween. The auxiliary outer end portion 41*c* is electrically connected to the outer end portion 30A via a through conductor (not shown) passing through the insulating layer 42*a*. By providing the auxiliary outer end portion 41*c* and making the outer end portion have a double structure, contact areas between the outer end portion and the external terminal electrodes are increased, and connectivity is improved.

The second upper planar coil 42 is symmetrical to the first upper planar coil 41. More specifically, the second upper planar coil 42 has a shape obtained by inverting the shape of the first upper planar coil 41 around an axis parallel to the short side of the element body 10. The second upper planar coil 42 shares the coil axis Z with the first upper planar coil 41. The outer end portion 42*a* of the second upper planar coil 42 is provided on the frame portion 34B, extends to the end surface 10*b* of the element body 10, and is exposed from the end surface 10*b*. The inner end portion 42*b* of the second upper planar coil 42 overlaps the through conductor 47 provided in the insulating layer 30A. Therefore, the inner end 42*b* of the second upper planar coil 42 is electrically connected to the inner end 41*b* of the first upper planar coil 41 via the through conductor 47. The second upper planar coil 42 is made of Cu, for example, and can be formed by electrolytic plating. In the present embodiment, the second upper planar coil 42 has an auxiliary outer end 41*a* that overlaps the outer end 30A of the first upper planar coil 41 with the insulating layer 42*c* interposed therebetween. The auxiliary outer end portion 42*c* is electrically connected to the outer end portion 30A via a through conductor (not shown) passing through the insulating layer 41*a*. By providing the auxiliary outer end portion 42*c* and making the outer end portion have a double structure, contact areas between the outer end portion and the external terminal electrodes are increased, and connectivity is improved.

The thickness of the first upper planar coil 41 and the thickness of the second upper planar coil 42 can be designed to be, for example, in a range of 20 to 40 μm (30 μm as an example). The thickness of the first upper planar coil 41 and the thickness of the second upper planar coil 42 may be the same or different. In the upper coil structure 40A, the first upper planar coil 41, the second upper planar coil 42, and the through conductor 47 provided in the insulating layer 30A constitute a first coil C1 having a coil axis Z.

The first upper insulator 51 and the second upper insulator 52 cover the insulating layer 30A, the first upper planar coil 41, and the second upper planar coil 42 so as to sandwich the insulating layer SL, the first upper planar coil 41, and the second upper planar coil 42. Both the first upper insulator 51 and the second upper insulator 52 are made of insulating resin. The first upper insulator 51 and the second upper insulator 52 are both made of an insulating resin, and may be made of a PP resin or a BT resin, for example. The first upper insulator 51 and the second upper insulator 52 may be composite members (so-called prepregs) containing resin and glass fiber. The first upper insulator 51 and the second upper insulator 52 can be formed by, for example, vacuum pressing an insulating resin sheet from the thickness direction of the element body 10. As a result, the spaces between the wires of the first upper planar coil 41 and the second upper planar coil 42 are filled with the resin material, and the inner surfaces and the outer surfaces of the first upper planar coil 41 and the second upper planar coil 42 are covered with the resin material. As described later, the first upper insulator 51 and the second upper insulator 52 are formed by blasting.

The thickness of the first upper insulator 51 and the thickness of the second upper insulator 52 can be designed to be in a range of 40 to 50 μm (45 μm as an example), for example. The thickness of the first upper insulator 51 and the thickness of the second upper insulator 52 may be the same or may be different.

As shown in FIG. 3, the lower coil structure 40B is provided on the sheet lower surface 30*b* of the coil overlapping portion 31 of the magnetic sheet 30. The lower coil structure 40B includes an insulating layer 30B, a first lower planar coil 43, a second lower planar coil 44, a first lower insulator 53, and a second lower insulator 54, and has a through hole 45B.

The insulating layer 30B of the lower coil structure 40B has a flat plate shape (for example, a sheet shape or a layer shape) like the insulating layer 30A of the upper coil structure 40A, and extends in parallel to the magnetic sheet 30. The insulating layer 30B has substantially the same shape as the magnetic sheet 30 when viewed from the thickness direction. Similarly to the magnetic sheet 30 and the insulating layer 30B, the insulating layer 30A includes an elliptical ring-shaped coil overlapping portion 31 extending along the long-side direction of the element body 10 and a pair of frame portions 34A and 34B extending along the short-side direction of the element body 10 and sandwiching the coil overlapping portion 31 from both sides. The insulating layer 30B can be designed to have a depth t2 of, for example, 10 to 50 μm (15 μm as an example). The thicknesses t2 of the insulating layers 30B may be the same as or different from the thicknesses t1 of the insulating layers 30A. The insulating layer 30B is made of an insulating material similarly to the insulating layer 30A, and may be made of, for example, a plastic material such as t resin.

The first lower planar coil 43 is a substantially oval spiral air-core coil wound around the opening 32 of the coil overlapping portion 31 in the same layer on the upper surface 30*a* of the insulating layer 30B. The first lower planar coil 43 shares the coil axis Z with the upper planar coils 41 and 42. The number of turns of the first lower planar coil 43 may be one turn or a plurality of turns. In the present embodiment, the number of turns of the first lower planar coil 43 is two to three. The first lower planar coil 43 has an outer end 43*a* and an inner end 43*b*. The outer end portion 43*a* is provided on the frame portion 34A, extends to the end surface 10*a* of the element body 10, and is exposed from the end surface 10*a*. The inner end portion 43*b* is provided at an edge of the opening 32. In the insulating layer 30B, a through conductor 48 extending in the thickness direction of the insulating layer 43*b* is provided at a position overlapping the inner end portion 30B of the first lower planar coil 43 so as to penetrate the insulating layer 30B. The first lower planar coil 43 is made of Cu, for example, and can be formed by electrolytic plating. In the present embodiment, the first lower planar coil 43 has an auxiliary outer end portion 44*a* that overlaps an outer end portion 30B of a second lower planar coil 44 described later with an insulating layer 43*c* interposed therebetween. The auxiliary outer end portion 43*c* is electrically connected to the outer end portion 30B via a through conductor (not shown) passing through the insulating layer 44*a*. By providing the auxiliary outer end portion 43*c* and making the outer end portion have a double structure, contact areas between the outer end portion and the external terminal electrodes are increased, and connectivity is improved.

The second lower planar coil 44 is symmetrical to the first lower planar coil 43. More specifically, the second lower planar coil 44 has a shape obtained by inverting the shape of the first lower planar coil 43 around an axis parallel to the short side of the element body 10. The second lower planar coil 44 shares the coil axis Z with the upper planar coils 41 and 42 and the first lower planar coil 43. The outer end portion 44*a* of the second lower planar coil 44 is provided on the frame portion 34B, extends to the end surface 10*b* of the element body 10, and is exposed from the end surface 10*b*. The inner end portion 44*b* of the second lower planar coil 44 overlaps the through conductor 48 provided in the insulating layer 30B. Therefore, the inner end 44*b* of the second lower planar coil 44 is electrically connected to the inner end 43*b* of the first lower planar coil 43 via the through conductor 48. The second lower planar coil 44 is made of Cu, for example, and can be formed by electrolytic plating. In the present embodiment, the second lower planar coil 44 has an auxiliary outer end 43*a* that overlaps the outer end 30B of the first lower planar coil 43 with the insulating layer 44*c* interposed therebetween. The auxiliary outer end portion 44*c* is electrically connected to the outer end portion 30B via a through conductor (not shown) passing through the insulating layer 43*a*. By providing the auxiliary outer end portion 44*c* and making the outer end portion have a double structure, contact areas between the outer end portion and the external terminal electrodes are increased, and connectivity is improved.

The thickness of the first lower planar coil 43 and the thickness of the second lower planar coil 44 can be designed to be, for example, in a range of 20 to 40 μm (30 μm as an example). The thickness of the first lower planar coil 43 and the thickness of the second lower planar coil 44 may be the same or different. In the lower coil structure 40B, the first lower planar coil 43, the second lower planar coil 44, and the through conductor 48 provided in the insulating layer 30B constitute a second coil C2 having a coil axis Z.

The first lower insulator 53 and the second lower insulator 54 cover the insulating layer 30B, the first lower planar coil 43, and the second lower planar coil 44 so as to sandwich them in the thickness direction of the element body 10. Both the first lower insulator 53 and the second lower insulator 54 are made of an insulating resin. Each of the first lower insulator 53 and the second lower insulator 54 is made of insulating resin, and may be made of PP resin or BT resin, for example. The first lower insulator 53 and the second lower insulator 54 may be composite members (so-called prepregs) containing resin and glass fiber. The first lower insulator 53 and the second lower insulator 54 can be formed by, for example, vacuum pressing an insulating resin sheet from the thickness direction of the element body 10. As a result, the spaces between the wires of the first lower planar coil 43 and the second lower planar coil 44 are filled with the resin material, and the inner surfaces and the outer surfaces of the first lower planar coil 43 and the second lower planar coil 44 are covered with the resin material. As described later, the first lower insulator 53 and the second lower insulator 54 are formed by blasting.

The thickness of the first lower insulator 53 and the thickness of the second lower insulator 54 can be designed to be in a range of 40 to 50 μm (45 μm as an example), for example. The thickness of the first lower insulator 53 and the thickness of the second lower insulator 54 may be the same as or different from each other.

Figure 6:
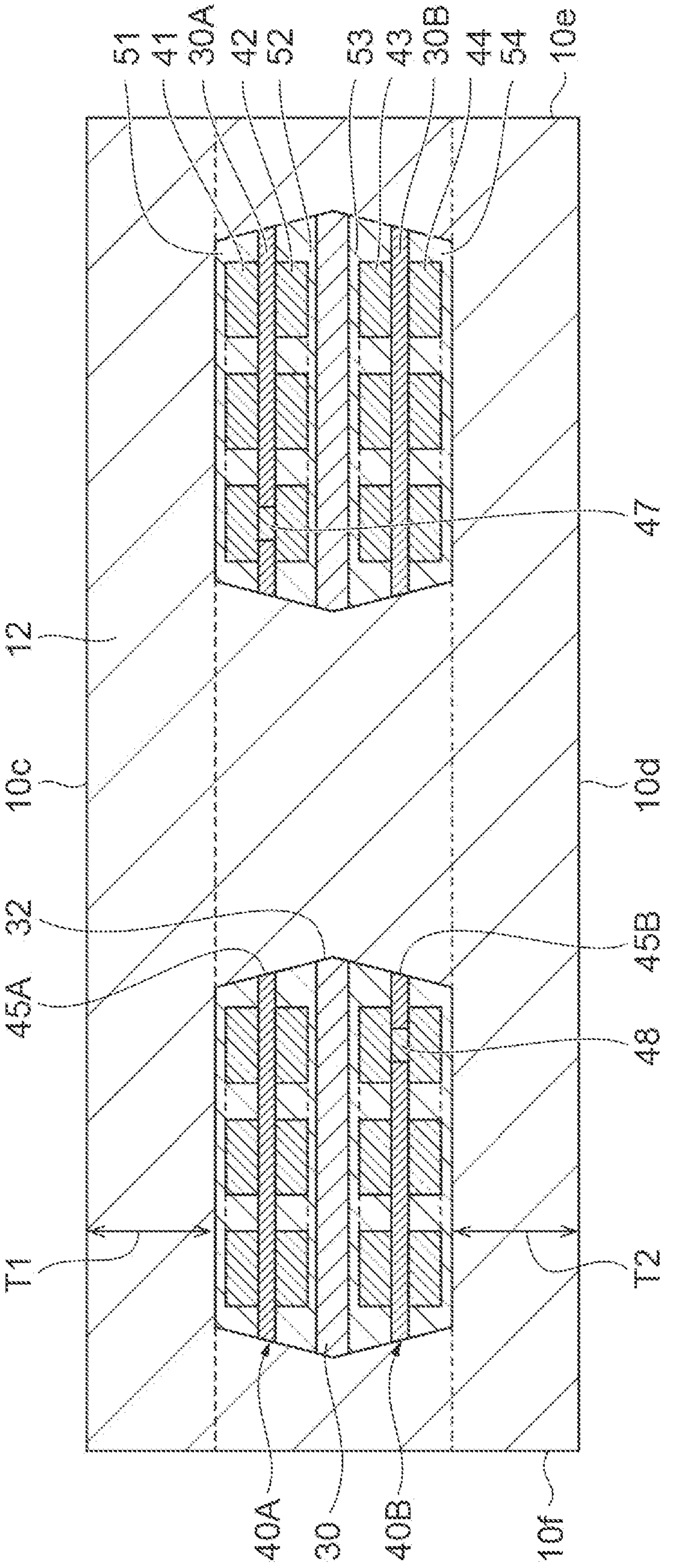
FIG. 6 is a cross-sectional view taken along line VI-VI of the element body shown in FIG. 2.

In the present embodiment, as shown in FIG. 6, the thickness T1 of the element body portion overlapping the upper coil structure 40A on the upper surface 10*c* side of the element body 10 and the thickness T2 of the element body portion overlapping the lower coil structure 40B on the lower surface 10*d* side of the element body 10 are designed to be equal to each other. However, the thicknesses T1 and T2 may be different from each other.

The two pairs of external terminal electrodes 60A, 60B, 60C, and 60D are provided in pairs on end surfaces 10*a* and 10*b* of the element body 10 that are parallel to each other.

Of the pair of external terminal electrodes 60A and 60B provided on the end surface 10*a*, the external terminal electrode 60A is connected to the outer end portion 43*a* of the first lower planar coil 43 of the lower coil structure 40B, and the external terminal electrode 60B is connected to the outer end portion 41*a* of the first upper planar coil 41 of the upper coil structure 40A. When viewed from the end surface 10*a* side, the external terminal electrode 60A is biased toward the side surface 10*f* side and covers the end surface 10*a* up to the vicinity of the side surface 10*f*. The external terminal electrode 60B is biased to the side surface 10*e* side, and covers the end surface 10*a* up to the vicinity of the side surface 10*e*. When viewed from the end surface 10*a* side, the external terminal electrode 60A and the external terminal electrode 60B are separated by a predetermined uniform width.

Of the pair of external terminal electrodes 60C and 60D provided on the end surface 10*b*, the external terminal electrode 60C is connected to the outer end portion 44*a* of the second lower planar coil 44 of the lower coil structure 40B, and the external terminal electrode 60D is connected to the outer end portion 42*a* of the second upper planar coil 42 of the upper coil structure 40A. The external terminal electrode 60C is biased to the side surface 10*f* side and covers the end surface 10*b* up to the vicinity of the side surface 10*f*. The external terminal electrode 60D is biased to the side surface 10*e* side, and covers the end surface 10*b* up to the vicinity of the side surface 10*e*. When viewed from the end surface 10*b* side, the external terminal electrode 60C and the external terminal electrode 60D are separated by a predetermined uniform width.

The external terminal electrode 60A of the end surface 10*a* and the external terminal electrode 60C of the end surface 10*b* are provided at positions corresponding to each other in the long-side direction of the element body 10. Similarly, the external terminal electrode 60B on the end surface 10*a* and the external terminal electrode 60D on the end surface 10*b* are provided at positions corresponding to each other in the long-side direction of the element body 10.

Each of the external terminal electrodes 60A, 60B, 60C, and 60D is bent in an L shape and continuously covers the end surfaces 10*a* and 10*b* and the upper surface 10*c*. In the present embodiment, the external terminal electrodes 60A, 60B, 60C, and 60D are made of resinous electrodes, for example, made of resins containing Ag powder.

In the coil component 1, when a voltage is applied between the external terminal electrode 60B and the external terminal electrode 60D, a current flows through the first coil 40A of the upper coil structure C1, and magnetic fluxes are generated around the first coil C1. Similarly, when a voltage is applied between the external terminal electrode 60A and the external terminal electrode 60C, a current flows through the second coil 40B of the lower coil structure C2, and magnetic fluxes are generated around the second coil C2. At this time, magnetic coupling may occur between the first coil C1 and the second coil C2 that share the coil axis Z.

In the magnetic sheet 30 in the coil component 1, as shown in FIG. 4, the coil overlapping portion 31 overlapping the coils C1 and C2 has an elliptical ring shape, and both the portion corresponding to the inner peripheral region of the coils C1 and C2 and the portion corresponding to the outer peripheral region of the coils C1 and C2 are removed. In the coil structures 40A and 40B of the coil component 1, the inner portions and the outer peripheral portions of the through holes 45A and 45B are removed. Therefore, both portions are filled with the magnetic materials constituting the element body 10 to constitute the inner core and the outer core of the coils C1 and the C2.

Figure 7:
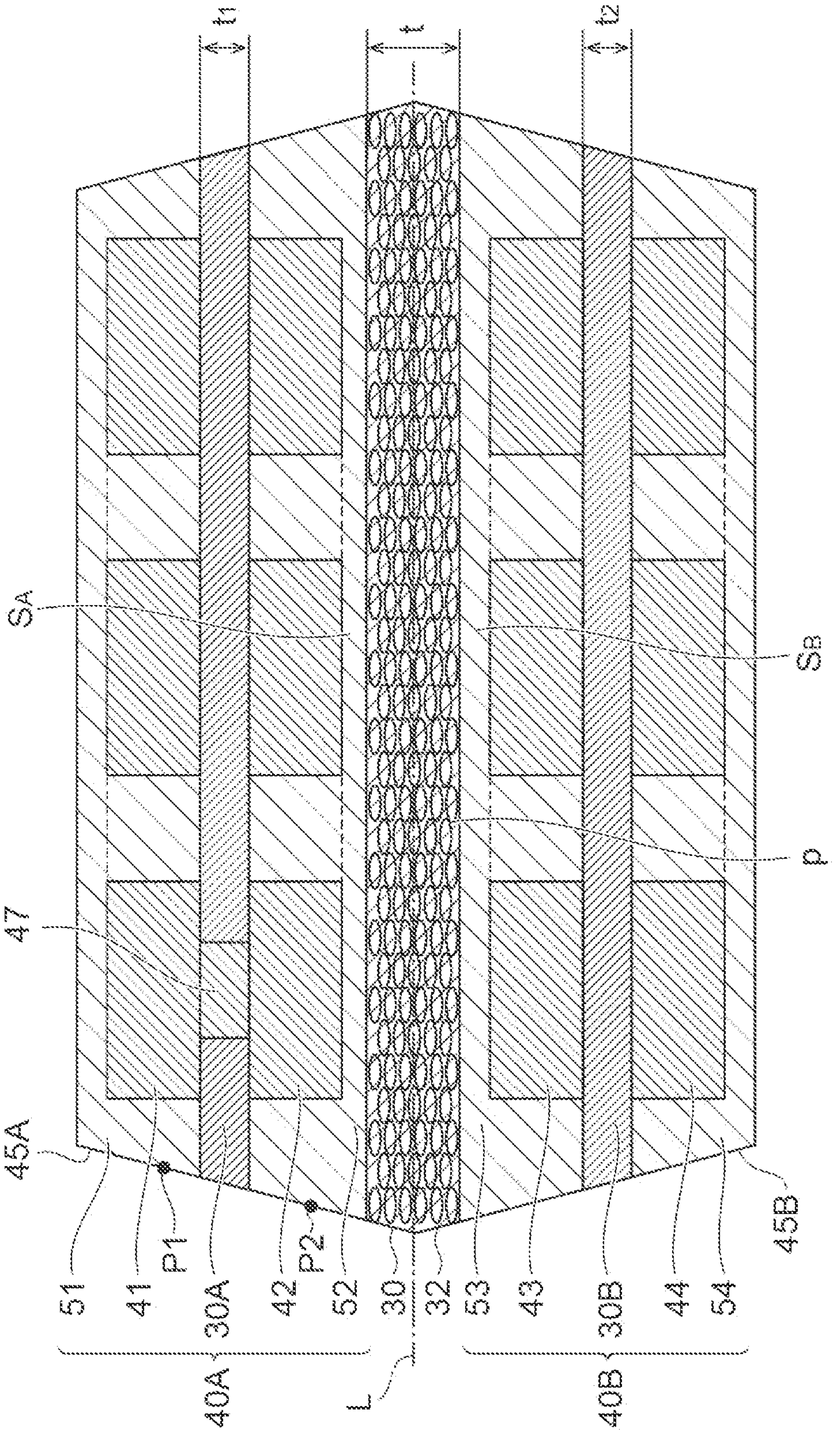
FIG. 7 is an enlarged view of a main part of the cross-sectional view shown in FIG. 6.

In the coil component 1, as shown in FIG. 7, the inner edges of the coil structures 40A and 40B (i.e., the edges defining the through holes 45A and 45B) are recessed with respect to the inner edges of the magnetic sheet 30 (i.e., the edges defining the through holes 32). In the present embodiment, the inner edge of the magnetic sheet 30 and the inner edges of the coil structures 40A and 40B have a cross-sectional shape that is bent in a dogleg shape, and the inner edges of the coil structures 40A and 40B gradually back down with increasing distance from the magnetic sheet 30 in the coil-axis Z direction. For example, when two points in the coil-axis Z direction are considered, the inner edge at the position P1 on the far side from the magnetic sheet 30 backs down from the inner edge at the position P2 on the near side. Further, in the present embodiment, in the cross section shown in FIG. 7 including the coil axis Z, the outer shapes of the coil structures 40A and 40B are substantially line-symmetric with respect to an imaginary straight line L orthogonal to the coil axis Z. Further, in the present embodiment, the inner edge of the magnetic sheet 30 is in contact with the metal powder contained in the metal magnetic powder-containing resin 12 constituting the element body 10.

Here, a method of forming the cross-sectional shapes of the magnetic sheet 30 and the coil structures 40A and 40B described above will be described.

Figure 8:
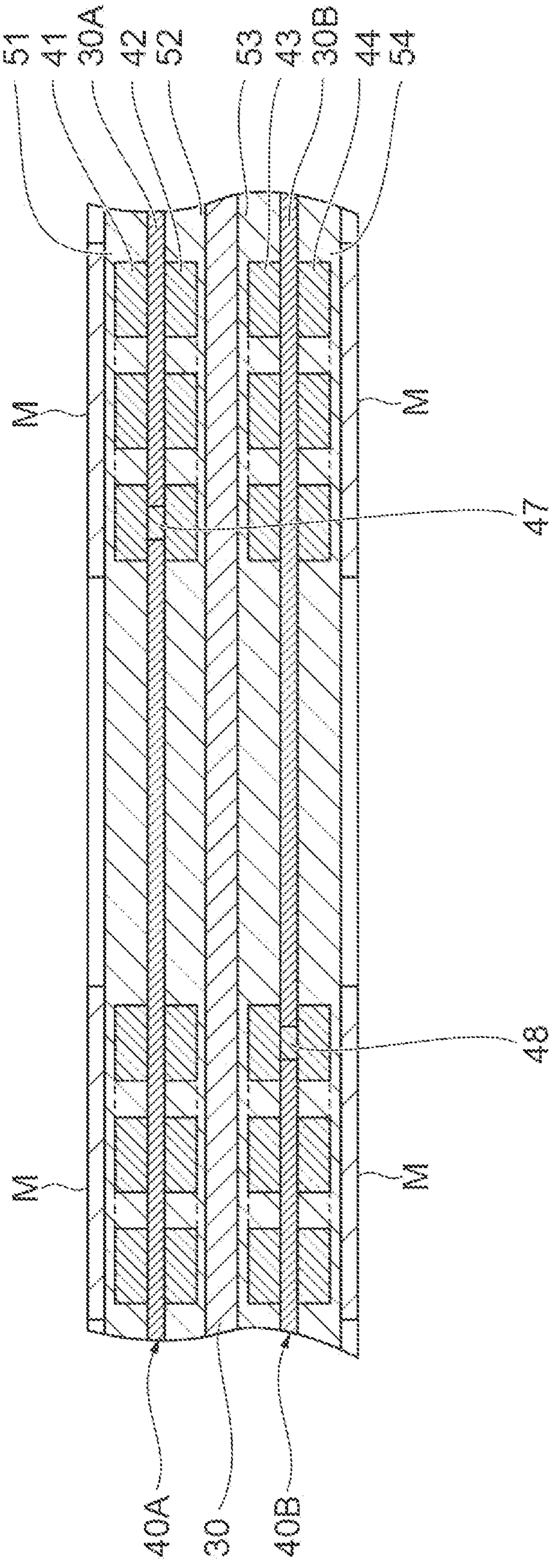
FIG. 8 is a cross-sectional view showing the magnetic sheet and the pair of coil structures in a middle stage of manufacturing the coil component of FIG. 1.
Figure 9:
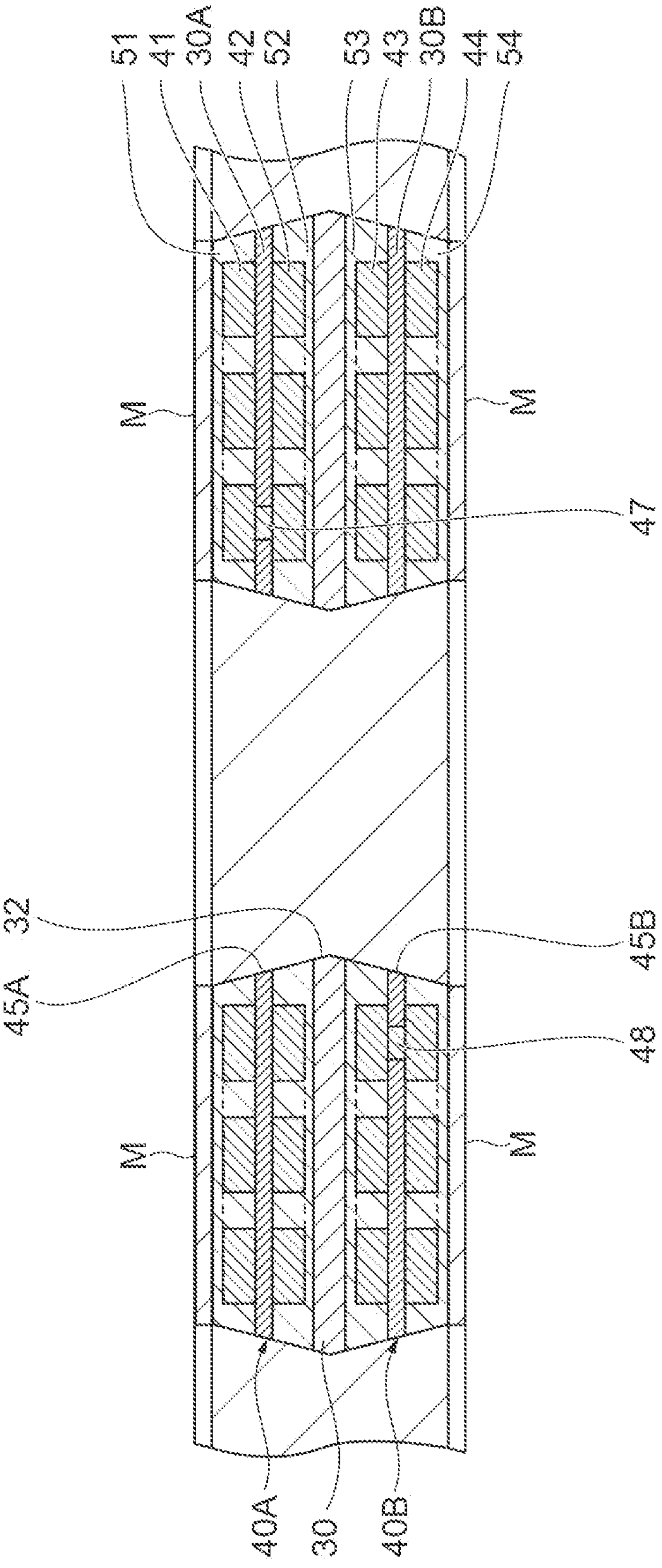
FIG. 9 is a cross-sectional view showing the magnetic sheet and the pair of coil structures in a middle stage of manufacturing the coil component of FIG. 1.

FIG. 8 shows a state after the magnetic sheet 30 and the coil structures 40A and 40B are vacuum-pressed, in which the through holes are not yet provided. In this state, blasting is performed using a resist mask M from the vertical direction (that is, the coil-axis Z direction) to mold the magnetic sheet 30 and the coil structures 40A and 40B. As a result, as shown in FIG. 9, the through hole 32 is provided in the magnetic sheet 30, and the through holes 40A and 40B are provided in the coil structures 45A and 45B. In addition, the outer edges of the magnetic sheet 30 and the coil structures 40A and 40B are formed. At this time, the cross-sectional shape of the dogleg shape described above can be obtained and the degree of bending of the dogleg can be adjusted by appropriately adjusting the conditions of the blast processing (for example, particle diameter, projection pressure, and the like).

The outer peripheral portions of the coil structures 40A and 40B may be removed or may not be removed.

In the coil component 1, leakage flux (that is, flux passing through only the first coil C1 and flux passing through only the second coil C2) is likely to be generated by the magnetic sheet 30 interposed between the first coil C1 and the second coil C2. The coupling coefficient can be adjusted by increasing or decreasing the leakage magnetic flux by the magnetic sheet 30. In the present embodiment, since the inner edge of the magnetic sheet 30 is in contact with the metal powder contained in the metal magnetic powder-containing polymer 12 constituting the element body 10 (that is, there is no gap between the magnetic sheet 30 and the metal powder), the magnetic fluxes generated in the coils C1 and C2 easily go around the magnetic sheet 30. For example, by increasing the magnetic permeability of the magnetic sheet 30, the leakage magnetic flux can be increased and the coupling coefficient can be decreased. In addition, the magnetic permeability of the magnetic sheet 30 can be increased by increasing the thickness of the magnetic sheet 30. In the present embodiment, the magnetic permeability of the magnetic sheet 30 is designed to be higher than the magnetic permeability of the element body material (that is, the metal magnetic powder-containing resin 12) constituting the element body 10 and higher than the magnetic permeability of the insulators 52 and 53 adjacent to the magnetic sheet 30 in the thickness direction. In particular, by increasing the magnetic permeability in the surface direction of the magnetic sheet 30 (the direction orthogonal to the coil axis Z), the leakage magnetic flux is effectively increased. The magnetic permeability of the magnetic sheet 30 can be adjusted by, for example, the thickness of the magnetic sheet 30, the form of the magnetic powder, the type of the magnetic powder, the content ratio of the magnetic powder, or the like.

In the present embodiment, as shown in FIG. 7, the magnetic powder p contained in the magnetic sheet 30 has a flat shape, and each magnetic powder extends along the surface direction of the magnetic sheet 30. In such a magnetic sheet 30, the magnetic permeability in the plane direction is relatively higher than the magnetic permeability in the thickness direction.

Since the coil component 1 employs the magnetic sheet 30, magnetic saturation is likely to occur in the magnetic sheet 30, and it is considered that the DC superimposition characteristic of the coil component 1 is deteriorated. However, as shown in FIG. 7, since the inner edges of the coil structures 40A and 40B back down with respect to the inner edge of the magnetic sheet 30 so that the magnetic fluxes generated in the coils C1 and C2 easily circulate, the deterioration of the DC superimposition characteristics due to the use of the magnetic sheet 30 is suppressed. One of the inner edges of the coil structures 40A and 40B may back down with respect to the inner edge of the magnetic sheet 30.

In addition, since the outer edges of the coil structures 40A and 40B also back down with respect to the outer edge of the magnetic sheet 30, magnetic fluxes generated in the coils C1 and C2 are more easily circulated. Therefore, the deterioration of the DC superimposition characteristics due to the adoption of the magnetic sheet 30 is further suppressed. Either one of the outer edges of the coil structures 40A and 40B may back down from the outer edge of the magnetic sheet 30.

It should be noted that the present disclosure is not limited to the above-described embodiment and may take various forms. For example, the number of turns of the planar coil constituting the coil can be increased or decreased as appropriate. In addition, three or more coils may be included in the element body. The coil included in each coil structure is not limited to the two layer structure of the planar coil, and may have a single-layer structure or may be formed of three or more layers. In addition, the insulating layer and the insulator (upper insulator and lower insulator) included in each coil structure may be omitted as appropriate.

What is claimed is:

1. A coil component comprising:

an element body made of a metal powder-containing resin;

a pair of coil structures provided in the element body, each of the pair of coil structures includes a pair of coils overlapping each other in a coil axis direction, each of the pair of coils has a pair of end portions extending to a surface of the element body;

two pairs of external terminals provided on the surface of the element body and connected to the end portions of the pair of coils, respectively; and, a magnetic sheet provided in the element body and interposed between the pair of coil structures in the coil axis direction;

wherein each of the pair of coil structures and the magnetic sheet is provided with a through hole extending along the coil axis direction, and an inner edge of at least one of the pair of coil structures backs down with respect to an inner edge of the magnetic sheet and wherein in at least one of the pair of coil structures, over a range from a position of the inner edge closest to the magnetic sheet to a position of the inner edge farthest from the magnetic sheet, a position of the inner edge on a side far from the magnetic sheet in the coil axis direction gradually backs down from a position of an inner edge on a side close thereto.

2. The coil component according to claim 1, wherein, in a cross section including the coil axis, outer shapes of the pair of coil structures are line-symmetric with respect to a line orthogonal to the coil axis.

3. The coil component according to claim 1, wherein the inner edge of the magnetic sheet is in contact with metal powder contained in a metal powder-containing resin constituting the element body.

4. The coil component according to claim 1, wherein element body portions overlapping the pair of coil structures in the coil axis direction have the same thickness.

5. The coil component according to claim 1, wherein the position of the inner edge on the side far from the magnetic sheet in the coil axis direction forms a linear slope and gradually backs down from the position of the inner edge on a side close thereto.

* * * * *